United States Patent
Donnelly et al.

(10) Patent No.: US 6,812,656 B2
(45) Date of Patent: Nov. 2, 2004

(54) SEQUENCED PULSE WIDTH MODULATION METHOD AND APPARATUS FOR CONTROLLING AND POWERING A PLURALITY OF DIRECT CURRENT MOTORS

(75) Inventors: Frank Wegner Donnelly, North Vancouver (CA); Brian Ward Gulayets, Burnaby (CA)

(73) Assignee: Railpower Technologies Corp., North Vancouver (GB)

( * ) Notice: Subject to any disclaimer, the term of this patent is extended or adjusted under 35 U.S.C. 154(b) by 61 days.

(21) Appl. No.: 10/083,587

(22) Filed: Feb. 27, 2002

(65) Prior Publication Data

US 2003/0160586 A1 Aug. 28, 2003

(51) Int. Cl.[7] .................................. H02P 7/68
(52) U.S. Cl. ................ 318/66; 318/68; 318/77; 318/139
(58) Field of Search ................ 318/45, 49, 50, 318/53, 59, 66, 68, 77, 85, 139

(56) References Cited

U.S. PATENT DOCUMENTS

| | | | |
|---|---|---|---|
| 3,569,810 A | 3/1971 | Thiele | 318/434 |
| 3,596,154 A * | 7/1971 | Gurwicz et al. | 318/252 |
| 3,970,160 A * | 7/1976 | Nowick | 318/67 X |
| 4,217,527 A | 8/1980 | Bourke et al. | 318/139 |
| 4,309,645 A | 1/1982 | De Villeneuve | 318/139 X |
| 4,423,362 A * | 12/1983 | Konrad et al. | 318/139 |
| 4,471,276 A | 9/1984 | Cudlitz | 318/139 X |
| 4,495,449 A | 1/1985 | Black et al. | 318/60 |
| 5,317,669 A | 5/1994 | Anderson et al. | 388/829 |
| 5,453,672 A | 9/1995 | Avitan | 318/439 |
| 5,585,706 A | 12/1996 | Avitan | 318/439 |
| 5,629,567 A * | 5/1997 | Kumar | 290/3 |
| 5,992,950 A * | 11/1999 | Kumar et al. | 303/151 |
| 5,998,880 A * | 12/1999 | Kumar | 290/40 B |
| 6,012,011 A * | 1/2000 | Johnson | 701/82 |
| 6,021,251 A | 2/2000 | Hammer et al. | 388/801 |
| 6,023,137 A * | 2/2000 | Kumar et al. | 318/254 |

* cited by examiner

Primary Examiner—Bentsu Ro
(74) Attorney, Agent, or Firm—Oyen Wiggs Green & Mutala

(57) ABSTRACT

A control system for individually controlling power from a single voltage source to a plurality of motors is described. A chopper circuit, in conjunction with the control system, generates drive-pulses, which operates the IGBT switching devices to sequentially provide pulses to each motor.

55 Claims, 3 Drawing Sheets

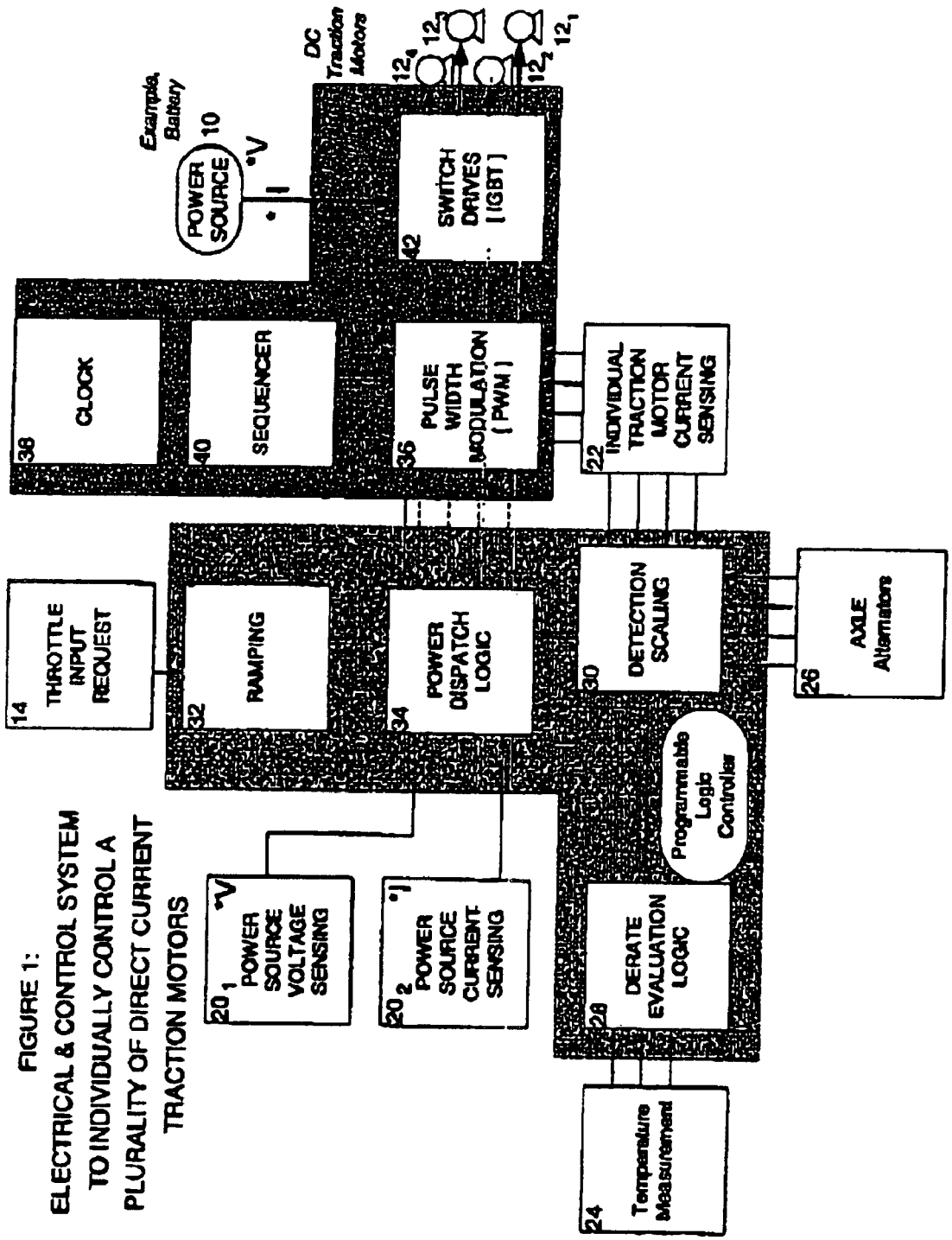
FIGURE 1: ELECTRICAL & CONTROL SYSTEM TO INDIVIDUALLY CONTROL A PLURALITY OF DIRECT CURRENT TRACTION MOTORS

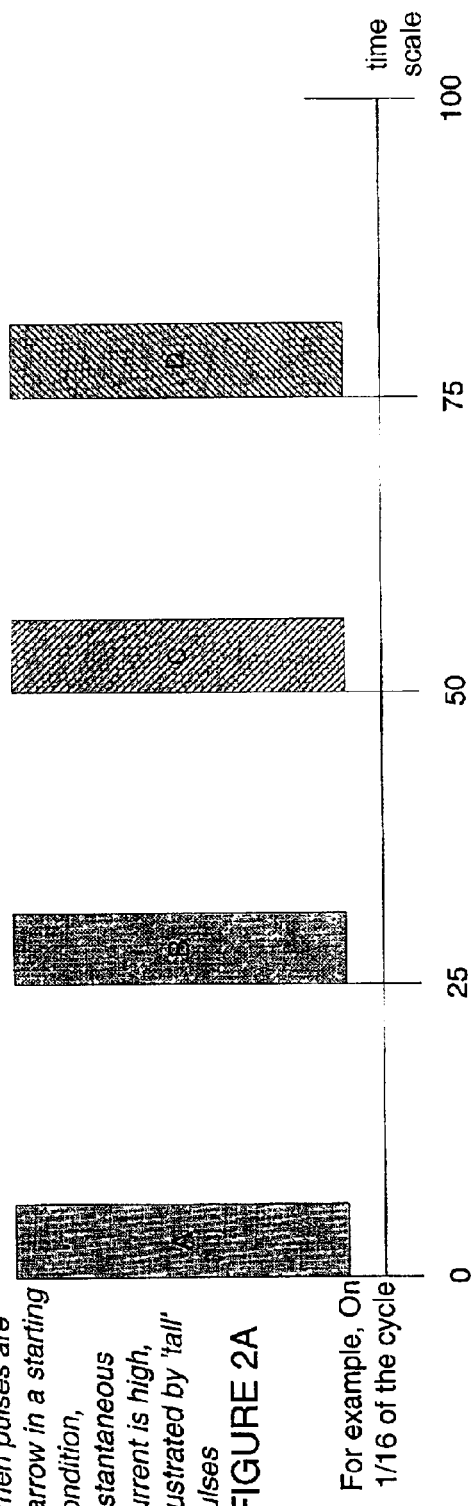
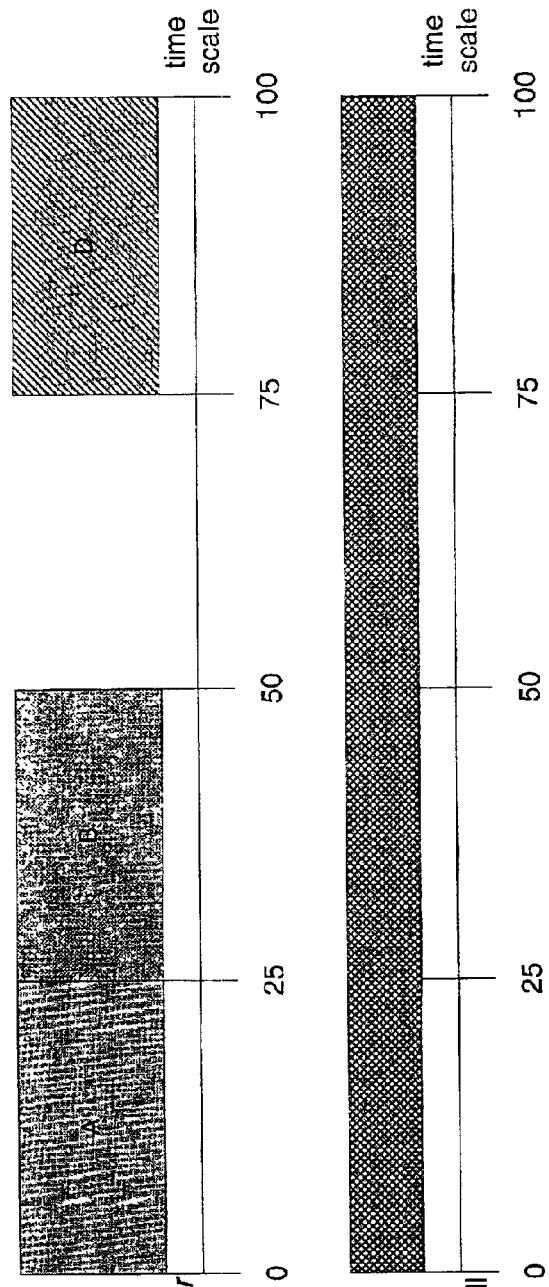

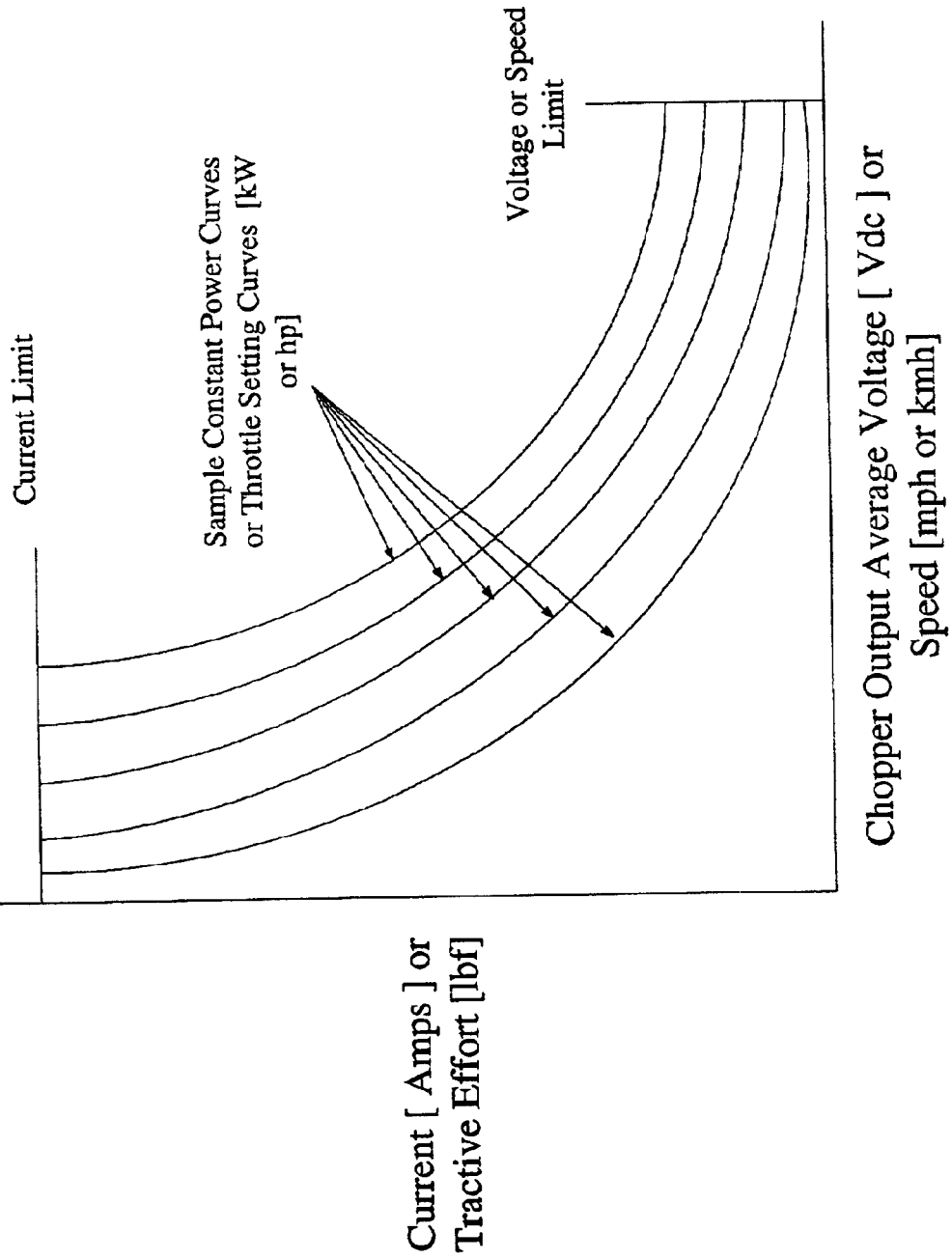
FIGURE 3: Power Application Curves - Objective of Pulse Width Modulation

US 6,812,656 B2

SEQUENCED PULSE WIDTH MODULATION METHOD AND APPARATUS FOR CONTROLLING AND POWERING A PLURALITY OF DIRECT CURRENT MOTORS

TECHNICAL FIELD

The invention relates to the field of control of direct current motors, and more particularly to a method of using sequential pulse width modulation for controlling and powering a plurality of direct current motors.

BACKGROUND

This invention relates generally to power and control systems for Direct Current [DC] motors. More specifically this invention relates to systems for individually powering and controlling a plurality of DC motors in both forward and reverse directions and through a continuum of speeds.

Direct Current motors have performed as the motive force in a variety of applications including locomotives, ships, trucks, vans, automobiles, farm equipment, forklifts, elevators, cranes, lawn mowers and trimmers, as well as leisure craft and vehicles, such as boats and golf carts. In select applications, such as locomotives, multiple direct current motors are used.

It is known in the prior art to control the speed of a direct current series motor by using a chopper circuit including a thyristor switch device in series with the motor. This is a more efficient form of control than using resistance control systems. The control of the speed of the motor is achieved by varying the width of voltage pulses supplied to the motor so that the resulting average power supplied to the motor establishes the operational speed of the motor. A thyristor is a type of diode with a controlling gate that allows current to pass through it when the gate is triggered. The thyristor is commutated by the current applied to it in the reverse direction. The thyristor thus effectively acts like a diode in that it only permits conduction in one direction, however, the point at which it starts conduction can be controlled by application of a control pulse to the gate. The chopper circuit thus controls the speed of the motor by switching the input voltage on and off depending on what output voltage is required; the longer the chopper is switched on, the higher the output voltage. The time that the chopper is switched on for is known as the on-time, while the ratio of on to off time is the mark to space ratio or chopper ratio.

A number of direct current motors are typically used to power a locomotive, for example, usually 4 or 6 DC motors are used, but sometimes 2 or 8. In the past, a single chopper has been used to control the speed of the DC motors. This has a number of disadvantages. For example, if one of the wheels is slipping, the chopper reduces power to all of the motors which risks further exacerbation of the problem.

There is a need for a more effective power control system, one that allows each motor amongst a plurality of DC motors to be controlled individually and separately.

SUMMARY OF INVENTION

The present invention provides a method of controlling power provided from a power source to a plurality of direct current traction motors comprising providing an individual chopper circuit for each traction motor. According to one aspect of the invention there is provided a method of controlling power provided from a direct current power source to a plurality of direct current traction motors comprising: a) determining the power requirement for each motor at each of a number of successive time intervals; b) determining the necessary effective voltage and pulse width to achieve the desired power for each motor; c) sequentially pulsing power to each motor for a duration necessary to achieve the power requirement at each time interval.

The present invention further provides an apparatus for controlling power provided from a direct current power source to a plurality of direct current traction motors comprising: a) means for determining the power requirement for each motor at each of a number of successive time intervals; b) means for determining the necessary voltage and pulse width to achieve the desired power for each motor; and c) means for sequentially pulsing power to each motor for a duration necessary to achieve said power requirement at each time interval.

BRIEF DESCRIPTION OF DRAWINGS

FIG. 1 is a block diagram illustrating an electrical control system for individually controlling a plurality of direct current motors according to the invention.

FIG. 2 is a chart demonstrating an illustrative example of developing sequential pulse width modulation.

FIG. 3 is a graph illustrating a sample of the desired power application curves to be achieved by pulse width modulation.

DESCRIPTION

Throughout the following description, specific details are set forth in order to provide a more thorough understanding of the invention. However, the invention may be practiced without these particulars. In other instances, well-known elements have not been shown nor described in detail to avoid unnecessarily obscuring the invention. Accordingly, the specification and drawings are to be regarded in an illustrative, rather than a restrictive, sense.

With reference to FIG. 1, a locomotive drive system comprises a DC power source 10 such as a battery and a plurality of DC motors 12, typically 4 or 6 in number. An input device 14 provides throttle input information by means of which the operator selects the desired speed or power requirement. The operator also receives feedback information from the controller 16.

A Programmable Logic Controller [PLC] 16 receives the information from the input device 14 and sends the information to the power control system [Chopper Circuit 18 in the power control system], which subsequently individually controls a plurality of DC motors 12.

The Drive System

DC power source 10 can be a battery, a fuel cell, an external source such as a catenary or 'third rail', or the output of an engine-driven generator. For purposes of illustration, a common locomotive configuration of 4 reversible DC motors 12 is shown. These motors are typically capable of equivalent speeds in either direction.

The Input Devices

The throttle input information is provided by an input device 14 that the locomotive operator uses to request the amount of power to be applied to the rails via the motors 12. This is typically a throttle notch between idle and eight positions but also could be an electronic device, such as an infinitely variable control or a touch screen.

A power source voltage sensing device 20, is provided to measure the voltage of the power source 10. This is an electronic device such as a voltage transducer. A current sensing device $20_2$ is provided to measure the amount of current flowing from the power source 10. This would be an electronic device, such as a current transducer. Further individual motor current sensing devices 22 enable the amount of current flowing to each DC motor 12 to be measured, allowing the information to be supplied to the PLC 16. These would typically be electronic devices such as current transducers.

To prevent damage associated with excess current to a given traction motor and its associated power electronic devices, the current sensing devices are also used to detect the amount of current in the individual traction motor circuits. When the current being monitored exceeds a protection limit, a signal instantaneously interrupts the current flowing from the battery thus limiting the current and minimizing the risk of damage associated with excess current.

A temperature measurement device 24 measures the temperature of various power control elements, DC motors, and the like, and sends the information to the PLC 16. Axle alternators 26 are electronic devices capable of measuring the revolutions of the axle on which they are installed. This information is sent to the PLC 16 to determine speed or detect situations that require attention and correction, such as wheel slip.

The Logic Device

The PLC 16 is programmed according to usual methods to carry out the following functions. The PLC processes throttle input requests, power source voltage, and determines current control points to satisfy individual traction motor power requirements. It also comprises a Derate Evaluation Logic function 28, namely logic to reduce the power demand below that requested by the operator for protection of equipment. This could include reducing power in case equipment is at risk of overheating or currents climb close to equipment design limits. It comprises a Detection Scaling function 30, namely Logic for determining non-optimal performance, such as wheel slip. Power reduction to individual motors is put in place in the case of differential wheel slip and overall power is reduced in the case of synchronous wheel slip.

A Ramping function 32 is provided, namely logic to ramp requested throttle level at a rate that is reasonable for the locomotive. A Power Dispatch Logic function 34 is also provided, namely central logic that evaluates any pertinent derate conditions, any wheel slip, as well as the requested throttle level, to determine the appropriate power level to be sent to the Pulse Width Modulation module 36 as well as any individual power reductions that may be necessary.

The Power Control System/Chopper Circuit

The Chopper Circuit 18 comprises the following elements. A clock 38 comprises an integrated circuit that generates a series of pulses. A sequencer 40 is an integrated circuit that sequences the pulses into uniform periods for purposes of the pulse width regions for each motor. A pulse width modulation [PWM] module 36 provides 'clipped' triangular waveforms that result in the creation of a series of pulses, which is used essentially to toggle the power switch devices on and off according to the pulses. The drive switches 42 are Insulated Gate Bipolar Transistors [IGBTs] that are switching devices that are capable of sequentially 'pulsing' the power source to the different motors at a very fast rate. A latching circuit (not shown), can also be provided that is set so that after the power switching transistor [IGBT] has failed to fully saturate, it will interrupt the drive to the transistor. This forces the transistor off and prevents the transistor from operating into a short circuit.

FIG. 2 illustrates how the drive switches 42 distribute the power pulses. Bar A in FIGS. 2A and 2B graphically represents the power pulse provided to DC motor $12_1$. Bar B in FIGS. 2A and 2B graphically represents the power pulse provided to DC motor $12_2$. Bar C in FIG. 2A illustrates the power pulse provided to DC motor $12_3$. Bar D in FIG. 2A and 2B illustrates the power pulse provided to DC motor $12_4$. The height of the bar indicates the instantaneous current provided to the motor. In FIG. 2A, which illustrates a sample of a starting condition, each motor receives power during 1/16 of the cycle. The selection of 1/16 of the cycle is illustrative only. The actual pulse duration would be determined by the length of time required to flow LS current instantaneously to each motor, which depends upon the difference in voltage between the power source voltage and the average chopper output voltage, which is the back generated Electro-Motive Force [EMF] of the motor. Each segment sequence is 1/4 of the clock frequency, which can be tailored for a given application. The height of the bar indicates the instantaneous current provided to the motor. FIG. 2B illustrates a condition where the wheel driven by motor $12_3$ is slipping. In this instance, each motor $12_1$, $12_2$ and $12_4$ receives power during one quarter of the cycle while motor $12_3$ receives no power. The bar height is reduced, showing the instantaneous current is reduced since the EMF voltage has increased, thus lowering the voltage difference, potential, between the battery and the said motor. The pulse duration has increased since the potential difference, or driving force, has decreased, so the current drops proportionately. In addition, a further cause of the pulse duration increasing would be an increased power request by the operator. FIG. 2C, illustrates a steady state situation in which the back Electro-Motive Force generated by the motor speed further reduces the voltage differential in the motors and power is provided to all motors 100% of the time at reduced voltage difference.

FIG. 3 illustrates a sample family of Constant Power Curves. At a given power level requested by the operator, there is a high initial average current flow to the motor since the Back EMF generated by the motor is low when the speed is low. As the motor speed increases, the Back EMF generated by the motor increases which reduces the voltage difference between the battery source and the motor, which results in a reduced current flow to the motor. Constant power to the motor is applied since the current flow drops proportionately to match the increased motor voltage.

In operation, the PLC determines the power requirement for each motor at each time interval based on inputs from the input device 14, ramping 32, derate evaluation logic 28 and detection scaling 30. Based on such inputs the PLC 34 calculates the necessary pulse width for each motor. The selected pulse widths are then provided to the switch drives which sequentially provide the desired pulse widths of power to the DC motors 12. When the locomotive is starting for example, a high voltage difference exists between the battery and the motor so a high current can be applied to the motor, which only requires a short pulse duration to meet the power requirement specified. This makes available the full supply voltage for starting in either direction. As the motor speed increases, a back voltage is created which reduces the effective voltage or voltage difference between the battery and the motor, thus necessitating a longer pulse to achieve the same power. If wheel slippage is detected, power can be shut off or reduced appropriately to the relevant motor.

Thus the invention provides the sequencing of the control of power to the DC motors. By sequencing the power pulses, the high current pulses for the individual traction motors are spaced and do not overlap until the current requirements moderate as the motor speed increases with the corresponding decreased voltage differential between the power source and the traction motor. This spacing of the current pulses results in individual instantaneous current requirements that are not additive. This independence of individual current requirements has the positive effect of minimizing the input filter requirements. Thus, with a minimum amount of capacitors, low source impedance is achieved, which is important to the operation of the drive.

A further benefit of the invention, derived from the flexibility of individually controlling power to a plurality of DC motors, is an efficient and effective approach to correcting wheel slip in a rail locomotive application. The simplified circuit affords a straightforward means of smoothly removing and then restoring power to a slipping wheel while maintaining the pre-slip level of power to the wheels not experiencing slip. This has the advantage of greatly reducing the power reductions typically experienced with incidents of wheel slip.

Thus the present invention provides a system to individually cut the power and then gradually restore the power to any particular motor, while maintaining constant power to the remaining motors. It provides a control system to limit the current drawn from the power source as well as the individual currents drawn by each of the motors.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of controlling power provided from a direct current power storage source to a plurality of direct current traction motors, comprising:
   (a) determining the power requirement for each motor at each of a number of successive time intervals;
   (b) determining the necessary effective amplitude and pulse width of a power pulse to achieve the desired power for each motor; and
   (c) sequentially pulsing power to each said motor for a duration necessary to achieve said power requirement at said time interval, wherein, for each motor, the frequency of pulses is maintained at least substantially constant and wherein the pulse width is varied depending upon the revolutions per minute of the respective traction motor.

2. The method of claim 1, wherein a temporal spacing between adjacent pulses to each motor is maximized.

3. The method of claim 1 wherein power is cut and then restored to at least a first traction motor, while maintaining constant power to the remaining motors, to correct loss of traction on an individual motor.

4. The method of claim 1 wherein over-current protection for each individually controlled direct current motor is provided.

5. The method of claim 1 wherein power is also provided to all motors constantly at reduced voltage difference during selected intervals.

6. An apparatus for controlling power provided from a direct current power storage source to a plurality of direct current traction motors, comprising:
   (a) a controller operable to determine the power requirement for each motor at each of a number of successive time intervals and determine the necessary amplitude and pulse width of a power pulse to achieve the desired power for each motor; and
   (b) a sequencer operable to sequentially pulse power to each said motor for a duration necessary to achieve said power requirement at said time interval, wherein, for each motor, the frequency of pulses is maintained at least substantially constant and wherein the pulse width is varied depending upon the revolutions per minute of the respective action motor.

7. The apparatus of claim 6, wherein a temporal spacing between adjacent pulses to each motor is maximized.

8. The apparatus of claim 6 wherein said sequencer comprises a pulse width modulation device.

9. The apparatus of claim 8 wherein said sequencer further comprises a clock.

10. The apparatus of claim 6 wherein said sequencer comprises a plurality of drive switches.

11. The apparatus of claim 10 wherein said drive switches are insulated gate bipolar transistors.

12. The apparatus of claim 10 further comprising latching circuit means adapted to interrupt the drive of said drive switch after said drive switch has failed to fully saturate to thereby prevent operating into a short circuit.

13. The apparatus of claim 6 wherein said controller comprises a programmable logic controller.

14. The apparatus of claim 6 wherein said controller comprises a throttle.

15. The apparatus of claim 6 wherein said controller comprises a power source current sensing device and a power source voltage sensing device.

16. The apparatus of claim 6 wherein controller comprises a traction motor current sensing device.

17. The apparatus of claim 6 wherein said controller comprises a ramping device.

18. The apparatus of claim 6 wherein said controller comprises a detection scaling device.

19. The apparatus of claim 6 wherein said controller comprises a derate evaluation logic device.

20. A method of controlling power provided from a direct current power source to a plurality of direct current traction motors, comprising:
   (a) determining the power requirement for each motor at each of a number of successive time intervals;
   (b) determining the necessary effective amplitude and pulse width of a power pulse to achieve the desired power for each motor; and
   (c) sequentially pulsing power to each said motor for a duration necessary to achieve said power requirement at said time interval, wherein, when the revolutions per minute (RPM) of each of the traction motors is below an intermediate RPM threshold, the pulses provided to the direct current traction motors are temporally non-overlapping and, when the RPM of each of the traction motors is above the intermediate RPM threshold, the pulses provided to the direct current traction motors are temporally at least partially overlapping.

21. The method of claim 20 wherein power is cut and then restored to at least a first traction motor, while maintaining constant power to the remaining motors, to correct loss of traction on an individual motor.

22. The method of claim 20 wherein over-current protection for each individually controlled direct current motor is provided.

23. The method of claim 20 wherein power is also provided to all motors constantly at reduced voltage difference during selected intervals.

24. An apparatus for controlling power provided from a direct current power source to a plurality of direct current traction motors, comprising:
  (a) a controller operable to determine the power requirement for each motor at each of a number of successive time intervals and determine the necessary amplitude and pulse width of a power pulse to achieve the desired power for each motor; and
  (b) a sequencer operable to sequentially pulse power to each said motor for a duration necessary to achieve said power requirement at said time interval, wherein, when the revolutions per minute (RPM) of each of the traction motors is below an intermediate RPM threshold, the pulses provided to the direct current traction motors are temporally overlapping and, when the RPM of each of be traction motors is above the intermediate RPM threshold, the pulses provided to the direct current traction motors are temporally at least partially overlapping.

25. The apparatus of claim 24 wherein said sequencer comprises a pulse width modulation device.

26. The apparatus of claim 25 wherein said sequencer further comprises a clock.

27. The apparatus of claim 24 wherein said sequencer comprises a plurality of drive switches.

28. The apparatus of claim 27 wherein said drive switches are insulated gate bipolar transistors.

29. The apparatus of claim 27 further comprising latching circuit means adapted to interrupt the chive of said drive switch after said drive switch has failed to filly saturate to thereby prevent operating into a short circuit.

30. The apparatus of claim 24 wherein said controller comprises a programmable logic controller.

31. The apparatus of claim 24 wherein said controller comprises a throttle.

32. The apparatus of claim 24 wherein said controller comprises a power source current sensing device and a power source voltage sensing device.

33. The apparatus of claim 24 wherein said controller comprises a traction motor current sensing device.

34. The apparatus of claim 24 wherein said controller comprises a ramping device.

35. The apparatus of claim 24 wherein said controller comprises a detection scaling device.

36. The apparatus of claim 24 wherein said controller comprises a derate evaluation logic device.

37. A method of controlling power provided from a direct current power source to a plurality of direct current traction motors, comprising:
  (a) determining that at least a first traction motor is experiencing wheel slip while each of the remaining traction motors are not experiencing wheel slip;
  (b) in response to the determining step, terminating power to the at least a first traction motor while continuing to provide power pulses to the remaining traction motors; and
  (c) sequentially pulsing power to each said traction motor for a duration sufficient to achieve a selected power requirement for each traction motor during a selected time interval, wherein, for each motor, the frequency of pulses is maintained at least substantially constant and wherein the pulse width is varied depending upon the revolutions per minute of the respective traction motor.

38. The method of claim 37, wherein a temporal spacing between adjacent pulses to each motor is maximized.

39. The method of claim 37 wherein power is cut and then restored to at least a first traction motor, while maintaining constant power to the remaining motors, to correct loss of traction on an individual motor.

40. The method of claim 37 wherein over-current protection for each individually controlled direct current motor is provided.

41. The method of claim 37 wherein power is also provided to all motors constantly at reduced voltage difference during selected intervals.

42. An apparatus for controlling power provided from a direct current power source to a plurality of direct current traction motors, comprising:
  a controller operable to (a) determine that at least a first traction motor is experiencing wheel slip while each of the remaining traction motors are not experiencing wheel slip and (b), in response to the wheel slip determination, terminate power to the at least a first traction motor while continuing to provide power pulses to the remaining traction motor;
  and further comprising a sequencer operable to sequential pulse power to each said motor for a duration necessary to achieve a selected power requirement at a selected time interval, wherein, for each motor, the frequency of pulses is maintained at least substantially constant and wherein the pulse width is varied depending upon the revolutions per minute of the respective traction motor.

43. The apparatus of claim 42, wherein a temporal. spacing between adjacent pulses to each motor is maximized 44. The apparatus of claim 42 wherein said sequencer comprises a pulse width modulation device.

45. The apparatus of claim 42 wherein said sequencer further comprises a clock.

46. The apparatus of claim 42 wherein said sequencer comprises a plurality of drive switches.

47. The apparatus of claim 46 wherein said drive switches are insulated gate bipolar transistors.

48. The apparatus of claim 46 further comprising latching circuit means adapted to interrupt the drive of said drive switch after said drive switch has failed to fully saturate to thereby prevent operating into a short circuit.

49. The apparatus of claim 42 wherein said controller comprises a programmable logic controller.

50. The apparatus of claim 42 wherein said controller comprises a throttle.

51. The apparatus of claim 42 wherein said controller comprises a power source current sensing device and a power source voltage sensing device.

52. The apparatus of claim 42 wherein controller comprises a traction motor current sensing device.

53. The apparatus of claim 42 wherein said controller comprises a ramping device.

54. The apparatus of claim 42 wherein said controller comprises a detection scaling device.

55. The apparatus of claim 42 wherein said controller comprises a derate evaluation logic device.

* * * * *